(12) United States Patent
Armitage et al.

(10) Patent No.: US 8,560,151 B2
(45) Date of Patent: Oct. 15, 2013

(54) DYNAMIC MONITORING OF MOBILE RAILWAY CAR UNDERCARRIAGE

(75) Inventors: David L. Armitage, Golden, CO (US); Gregory Froim Kushnir, Denver, CO (US); Mark Alvin Mason, Thornton, CO (US); Theodore Cutler Johnson, Jr., Frisco, CO (US)

(73) Assignee: Cartasite, Inc., Denver, CO (US)

( * ) Notice: Subject to any disclaimer, the term of this patent is extended or adjusted under 35 U.S.C. 154(b) by 173 days.

(21) Appl. No.: 13/105,293

(22) Filed: May 11, 2011

(65) Prior Publication Data

US 2011/0282540 A1 Nov. 17, 2011

Related U.S. Application Data

(60) Provisional application No. 61/333,428, filed on May 11, 2010.

(51) Int. Cl.
*G05D 1/00* (2006.01)
*G05D 3/00* (2006.01)
*G06F 7/00* (2006.01)
*G06F 17/00* (2006.01)

(52) U.S. Cl.
USPC .............................. 701/20; 701/19; 340/10.1

(58) Field of Classification Search
USPC ..................... 701/20; 340/10.1, 442, 686.1
See application file for complete search history.

(56) References Cited

U.S. PATENT DOCUMENTS

| 5,201,834 | A  | * | 4/1993 | Grazioli et al. | 246/169 R |
|---|---|---|---|---|---|
| 5,488,910 | A  | * | 2/1996 | Pees et al. | 105/166 |
| 5,867,404 | A  | * | 2/1999 | Bryan | 714/724 |
| 6,539,293 | B2 | * | 3/2003 | Bachtiger et al. | 701/20 |
| 6,714,858 | B2 | * | 3/2004 | Oblizajek et al. | 701/124 |
| 7,034,711 | B2 | * | 4/2006 | Sakatani et al. | 340/686.1 |
| 7,561,035 | B2 | * | 7/2009 | Sahashi et al. | 340/442 |
| 7,705,743 | B2 | * | 4/2010 | Barone et al. | 340/682 |
| 2007/0152107 | A1 | * | 7/2007 | LeFebvre et al. | 246/169 R |
| 2008/0195265 | A1 | * | 8/2008 | Searle et al. | 701/19 |
| 2010/0078527 | A1 | * | 4/2010 | Burkhart et al. | 246/169 A |

* cited by examiner

*Primary Examiner* — Khoi Tran
*Assistant Examiner* — Rachid Bendidi

(57) ABSTRACT

What is disclosed is a mobile railway car monitoring system. The mobile railway car monitoring system includes a plurality of sensor nodes coupled to an undercarriage portion of a railway car, and a control node coupled to the railway car. Each of the plurality of sensor nodes is configured to monitor the undercarriage portion of the railway car when in motion and transmit information about the undercarriage portion to the control node. The control node is configured to receive the information about the undercarriage portion, process the information to determine a fault condition for the undercarriage portion, and wirelessly report the fault condition to a collection system.

18 Claims, 6 Drawing Sheets

DYNAMIC MONITORING OF MOBILE RAILWAY CAR UNDERCARRIAGE

RELATED APPLICATIONS

This patent application is related to and claims priority to U.S. Provisional Patent Application No. 61/333,428, entitled "Mobile Railway Car Sensor System," filed on May 11, 2010, which is hereby incorporated by reference in its entirety.

TECHNICAL FIELD

Aspects of the disclosure are related to the field of vehicle monitoring devices, and in particular, railway car sensor systems.

TECHNICAL BACKGROUND

Railway cars, such as those found in freight trains and passenger trains, include undercarriage portions to roll the railway car and an associated payload across railroad tracks. The undercarriage portion typically includes wheels and related equipment, such as axles, bearings, trucks, brakes, journals, gears, and other moving parts, which can experience harsh conditions while in use. These harsh conditions can include elevated temperatures while under heavy loads and during start/stop conditions. Stationary equipment, such as thermal imaging inspection equipment, or 'hotbox' detectors can be positioned at various points along a railroad track to take a snapshot of railway car bearing status. Stationary impact detectors can also be installed in the rails and used to detect wheel damage.

Overview

What is disclosed is a mobile railway car monitoring system. The mobile railway car monitoring system includes a plurality of sensor nodes coupled to an undercarriage portion of a railway car, and a control node coupled to the railway car. Each of the plurality of sensor nodes is configured to monitor the undercarriage portion of the railway car when in motion and transmit information about the undercarriage portion to the control node. The control node is configured to receive the information about the undercarriage portion, process the information to determine a fault condition for the undercarriage portion, and wirelessly report the fault condition to a collection system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
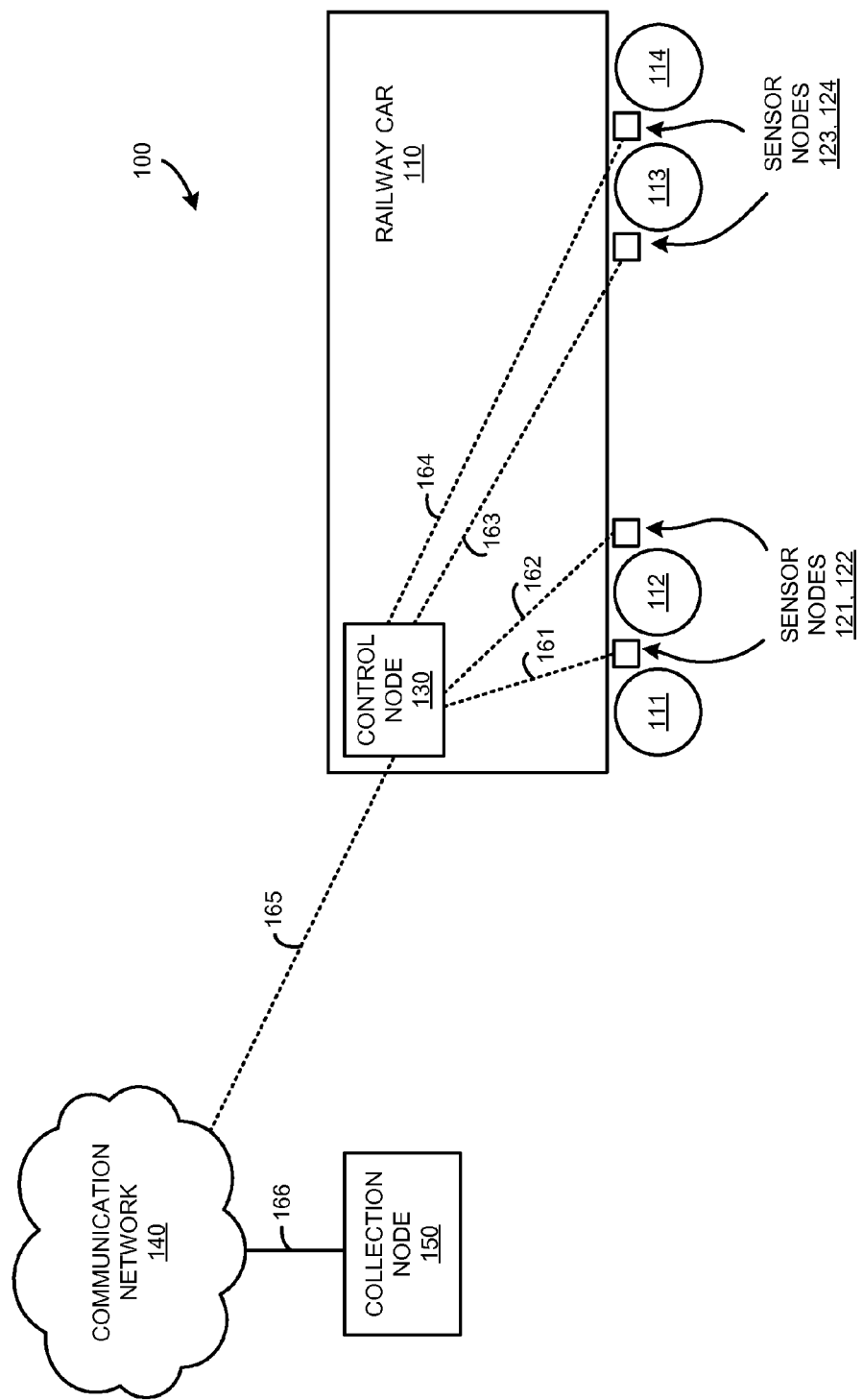
FIG. 1 is a system diagram illustrating a railway car monitoring system.

FIG. 1 is a system diagram illustrating railway car monitoring system 100. System 100 includes railway car 110, undercarriage elements 111-114 of railway car 110, sensor nodes 121-124, control node 130, communication network 140, and collection node 150. Control node 130 and each of sensor nodes 121-124 communicate over links 161-164, respectively. Control node 130 and communication network 140 communicate over wireless link 165. Communication network 130 and collection node 150 communicate over link 166. In this example, sensor node 121 is coupled to undercarriage element 111, sensor node 122 is coupled to undercarriage element 112, sensor node 123 is coupled to undercarriage element 113, and sensor node 124 is coupled to undercarriage element 114. It should be understood that although four sensor nodes and undercarriage elements are shown in FIG. 1, a different number of sensor nodes or undercarriage elements could be included.

Railway car 110 comprises a vehicle used on a rail transport system, such as a freight car, truck, wagon, coach, or passenger car. Railway car 110 could be used to carry freight, cargo, passengers, or other items. Railway car 110 includes undercarriage portions, shown as undercarriage elements 111-114 in FIG. 1. Undercarriage elements 111-114 each are an element or portion of the undercarriage of railway car 110. Undercarriage elements 111-114 typically each comprise equipment related to the rolling motion of railway car 110, such as a wheel, axle, gearbox, bearing, bearing box, journal box, trucks, brakes, or other equipment.

Sensor nodes 121-124 each include equipment to sense and report information about undercarriage elements of a railway car. Each of sensor nodes 121-124 includes a sensor portion, and the sensor portion could include thermometers, thermocouples, thermistors, thermopiles, infrared (IR) emitters/detectors, microphones, ultrasonic emitters/detectors, accelerometers, strain gauges, flow gauges, chemical sensors, microelectromechanical system (MEMS) sensors, electrical sensors, among other sensing equipment and circuitry. Each of sensor nodes 121-124 also includes a transceiver portion for communication with control node 130. In some examples, the transceiver portion includes a wireline transceiver for communicating with control node 130 over a wire, optical fiber, or other medium. In other examples, the transceiver portion includes a wireless transceiver and antenna for wirelessly communicating with control node 130. Each of sensor nodes 121-124 could also include a processing portion for receiving the sensor information, amplifying, scaling, modifying, adjusting, digitizing, or converting the sensor information, as well as controlling the transceiver portion and sensor portions. Each of sensor nodes 121-124 could also comprise a power system, such as a battery or solar cell.

Sensor nodes 121-124 are each attached or coupled to the associated undercarriage element of railway car 110. In some examples, sensor nodes 121-124 are fastened to the associated undercarriage element with a mechanical fastener, such as a screw, rivet, wire, harness, weld, latch, or tie. In other examples, sensor nodes 121-124 are each coupled to the associated undercarriage element with an adhesive, such as glue, tape, Velcro, suction, or other adhesive or adhesive method. In yet further examples, sensor nodes 121-124 are each coupled to the associated undercarriage element with a magnet, such as an electromagnet, permanent magnet, rare-earth magnet, ceramic magnet, or other magnetic attachment device. Sensor nodes 121-124 could each be encased in a weatherproof or sealed enclosure, or may have openings for air circulation.

Control node 130 includes circuitry and equipment to exchange communications with each of sensor nodes 121-124 over links 161-164, respectively. In many examples, control node 130 also includes circuitry and equipment to exchange communications with a base station of a wireless communication network, such as a cellular communication device, satellite communication device, mobile phone circuitry, satellite phone, mobile network device, or other equipment. Control node 130 may also include RFID equipment for exchanging data with RFID devices. Control node 130 may also include user interface systems, memory devices, computer-readable storage mediums, software, processing circuitry, or some other components. In some examples, control node 130 includes a positioning system, such as a global positioning system (GPS) receiver, to receive and interpret signals from positioning satellites to determine geographic coordinates of control node 130. Control node 130 could also comprise a power system, such as a battery or solar cell.

Control node 130 is attached or coupled to railway car 110. In some examples, control node 130 is fastened to railway car 110 with a mechanical fastener, such as a screw, rivet, wire, harness, weld, latch, or tie. In other examples, control node 130 is coupled to railway car 110 with an adhesive, such as glue, tape, Velcro, suction, or other adhesive or adhesive method. In yet further examples, control node 130 is coupled to railway car 110 with a magnet, such as an electromagnet, permanent magnet, rare-earth magnet, ceramic magnet, or other magnetic attachment device. Control node 130 could be coupled to railway car 110 internally or externally, on a side or end portion, among other locations. Control node 130 could be encased in a weatherproof or sealed enclosure, or may have openings for air circulation.

Communication network 140 could include base stations, base station control systems, Internet access nodes, telephony service nodes, wireless data access points, routers, gateways, or other wireless communication systems, including combinations thereof. Communication network 140 may also comprise optical networks, asynchronous transfer mode (ATM) networks, packet networks, metropolitan-area networks (MAN), or other network topologies, equipment, or systems, including combinations thereof. In typical examples, communication network 140 includes many base stations and associated equipment for providing communication services to many wireless and mobile devices across a geographic region.

Collection node 150 comprises equipment for receiving fault conditions, sensor information, location information, or other information from control node 130 through communication network 140. Collection node 150 also includes a computer system, microprocessor, circuitry, or some other processing device or software system, and may be distributed among multiple processing devices. Examples of collection node 150 may also include software such as an operating system, logs, utilities, drivers, networking software, and other software stored on a computer-readable medium. Collection node 150 could also include application servers, application service provider systems, database systems, logistics systems, web servers, or other systems.

In the example shown in FIG. 1, collection node 150 communicates with control node 130 through communication network 140, although other configurations could be employed. Collection node 150 could collect fault conditions and other information from many control nodes. For example, on a train where many railway cars are connected in series, a control node could be coupled to each railway car along with associated sensor nodes. Collection node 150 could receive information from each control node of the train, and thus monitor the entire train. In some examples, control nodes include a GPS receiver, and could also provide positioning information to collection node 150. Collection node 150 could determine a position of a train based upon this information, as well as differentiate railway cars from each other within the train. Fault conditions could be isolated to a particular railway car. In further examples, the information received from multiple control nodes could be used to determine an order of railway cars in a train.

Communication links 161-164 each use various communication media, such as air, space, metal, optical fiber, or some other signal propagation path, including combinations thereof. Communication links 161-164 could each use various communication protocols, such as Internet Protocol (IP), Ethernet, Wireless Fidelity (WiFi), Bluetooth, Controller Area Network (CAN) bus, Inter-Integrated Circuit (I2C), 1-Wire, Radio Frequency Identification (RFID), optical, circuit-switched, communication signaling, or some other communication format, including combinations, improvements, or variations thereof. Communication links 161-164 could each be direct links or may include intermediate networks, systems, or devices. In some examples, communication links 161-164 each operate using wireless protocols as described for wireless link 165.

Wireless link 165 uses the air or space as the transport media. Wireless link 165 may use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WiFi), High Speed Packet Access (HSPA), Radio Link Protocol (RLP), satellite networks (such as Inmarsat, GlobalStar, OrbComm, Iridium), satellite phone communications (such as Iridium), or some other wireless communication format, including combinations, improvements, or variations thereof. In further examples, wireless link 165 is a Radio Frequency Identification (RFID) link.

Communication link 166 uses various communication media, such as air, space, metal, optical fiber, or some other signal propagation path, including combinations thereof. Communication link 166 could use various communication protocols, such as Time Division Multiplex (TDM), asynchronous transfer mode (ATM), Internet Protocol (IP), Ethernet, Wireless Fidelity (WiFi), synchronous optical networking (SONET), circuit-switched, communication signaling, or some other communication format, including combinations, improvements, or variations thereof. Communication link 166 could be a direct links or may include intermediate networks, systems, or devices. In some examples, communication link 166 operates using wireless protocols as described for wireless link 165.

Links 161-166 may each include many different signals sharing the same link—as represented by the associated lines in FIG. 1—comprising access channels, forward links, reverse links, user communications, communication sessions, overhead communications, frequencies, other channels, carriers, timeslots, spreading codes, transportation ports, logical transportation links, network sockets, packets, or communication directions.

Figure 2:
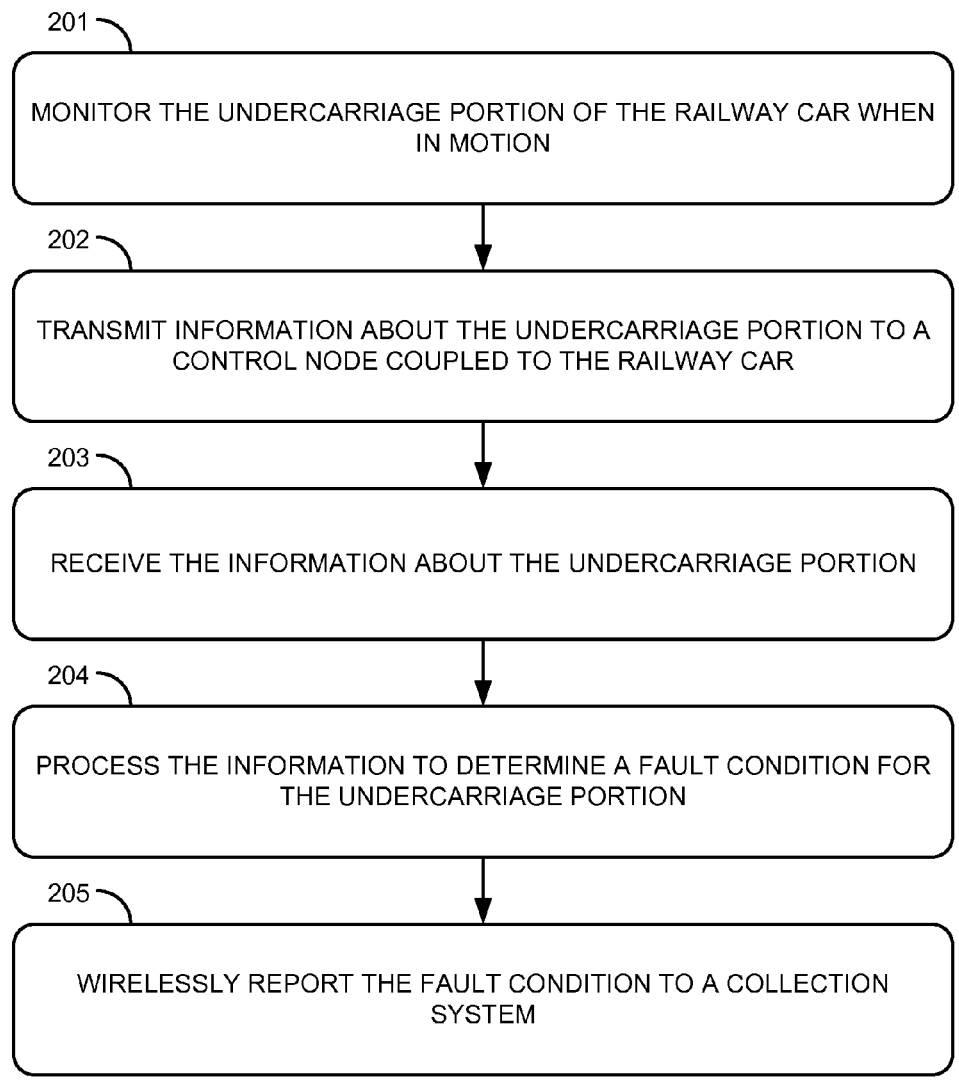
FIG. 2 is a flow diagram illustrating method of operating a railway car monitoring system.

FIG. 2 is a flow diagram illustrating method of operating railway car monitoring system 100. The operations of FIG. 2 are referenced herein parenthetically. In FIG. 2, each of sensor nodes 121-124 sense and monitor (201) the undercarriage portion of railway car 110. Each of sensor nodes 121-124 could sense and monitor other equipment associated with railway car 110. The information monitored could include undercarriage element temperature, ambient temperature, vibration, noise, among other information. In typical examples, sensor nodes 121-124 will sense and monitor the equipment while railway car 110 is in motion, such as when rolling.

Each of sensor nodes 121-124 transmits (202) the monitored information about the undercarriage portion to control node 130 coupled to railway car 110. In this example, each of sensor nodes 121-124 transmits the monitored information to control node 130 over the associated link 161-164. In some examples, each of sensor nodes 121-124 is configured to wirelessly transmit the monitored information about the undercarriage portion to control node 130. Each of sensor nodes 121-124 could also process the sensor information, which may include amplifying, scaling, modifying, adjusting, digitizing, or converting the sensor information, and transfer the processed sensor information to control node 130. Each of sensor nodes 121-124 could also report other information to control node 130, such as position, time, battery life, sensor status, inoperative sensors, serial numbers, sensor identifiers, among other information.

Control node 130 receives (203) the information about the undercarriage portion. The information received could include sensor information, or modified sensor information, from each of sensors 121-124 received over wireline or wireless links. Control node 130 processes (204) the information to determine a fault condition for the undercarriage portion. The fault condition could include conditions such as hotbox conditions, dragging equipment, wheel impact or sliding wheel conditions, high car or shifted load conditions, hot wheel conditions, door opening, tank level, humidity, temperature, shock, bearing temperature, vibration signatures, truck tracking deviations, among other conditions. A hotbox condition includes where an equipment box, shroud, enclosure, or other equipment container, experiences an elevated temperature. A hotbox condition is typically caused by a fault with the equipment contained within the box, such as a loss of lubricant or coolant in the box, damage, or from ambient conditions around the box, among other causes, including combinations thereof.

Control node 130 then wirelessly reports (205) the fault condition to a collection system. In this example, the collection system includes collection node 150. In FIG. 1, collection node 150 communicates with control node 130 through communication network 140, although other configurations could be employed. Control node 130 could also report other information to collection node 150, such as position, time, battery life, sensor status, inoperative sensors, serial numbers, network addresses, railway car identifiers, among other information.

In some examples, to determine the fault condition, control node 130 is configured to process the information received from each of sensor nodes 121-124 over a period of time to determine a threshold for reporting the fault condition. In many examples, sensor information can be affected by ambient temperature, motion, time-dependent effects, noise, or other phenomena. Control node 130 could process the sensor information to determine anomalies from an average, such as an anomaly from a running average of the temperature of all wheels on railway car 110. In other examples, a dynamic threshold is determined. The dynamic threshold could be adjusted in situ as railway car conditions change, such as during motion, acceleration, ascent/descent, cornering, during weather events, time of day, position, or due to other conditions. For example, while railway car 110 is cornering, a different temperature may be sensed for wheels on the outside portion of the turn than for wheels on the inside portion of the turn. Control node 130 could take this cornering into account when determining if an anomaly exists before reporting a fault condition to collection node 150. In other examples, the ambient temperature or weather conditions could be evaluated to determine an anomaly of an undercarriage element.

In some examples of analyzing the sensor information, a moving average and trend analysis is employed on the entire population of the undercarriage elements, such as those monitored by sensor nodes 121-124. Statistically significant deviations are derived from a series of sensor data captured over time for one or several members of the population of sensors. Each of sensor nodes 121-124 typically measure similar conditions for the undercarriage elements even though the conditions themselves may change or trend together. Deviations from these similar conditions are monitored. When one or more of the sensor nodes begin to deviate from the others in the population, then a failure condition could be determined. In this example, the deviations are not deviations of data of a single data reading or a single undercarriage element, but instead deviations from a time series of data readings for all undercarriage elements of railway car 110.

Figure 3:
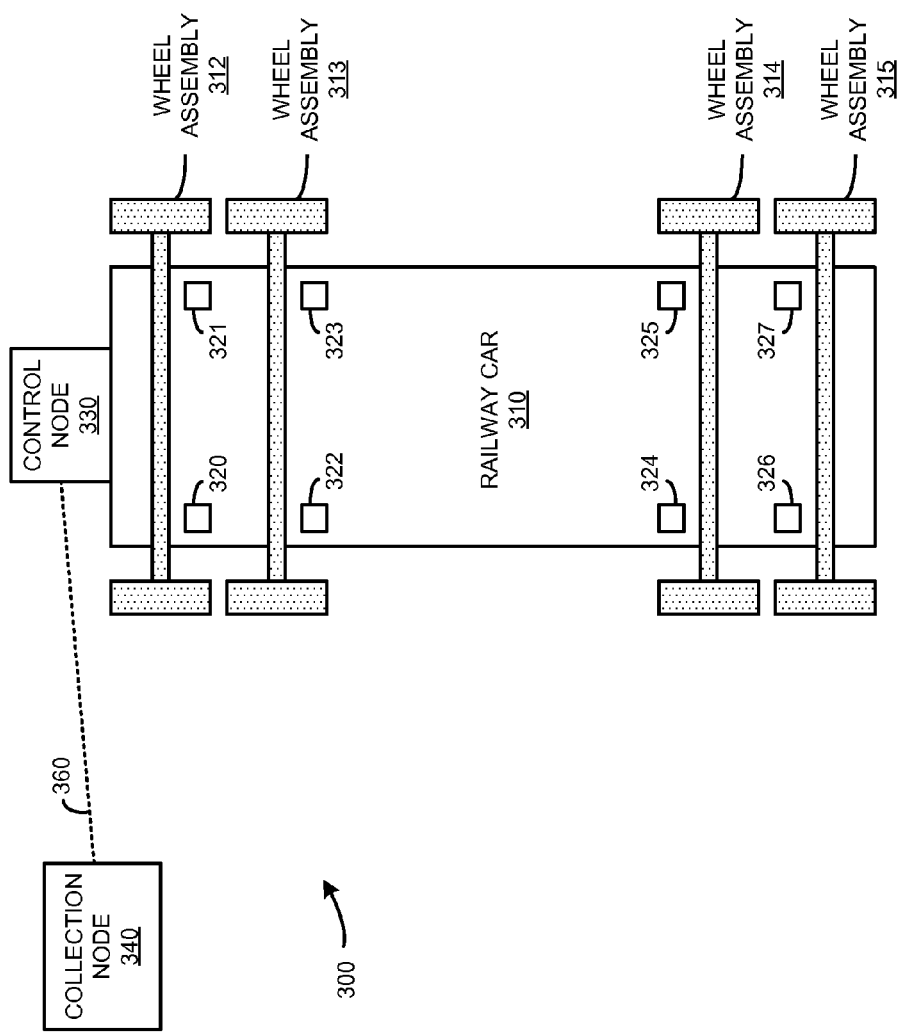
FIG. 3 is a system diagram illustrating a railway car monitoring system.

FIG. 3 is a system diagram illustrating railway car monitoring system 300. Railway car monitoring system 300 includes railway car 310, wheel assemblies 312-315 of railway car 310, sensor nodes 320-327, control node 330, and collection node 340. Control node 330 and each of sensor nodes 320-327 communicate over wireless links, not shown for clarity in FIG. 3. Control node 330 and collection node 340 communicate over wireless link 360, which is a Radio Frequency Identification (RFID) link in this example. In this example, sensor nodes 320-321 monitor wheel assembly 312, sensor nodes 322-323 monitor wheel assembly 313, sensor nodes 324-325 monitor wheel assembly 314, and sensor nodes 326-327 monitor wheel assembly 315. It should be understood that although eight sensor nodes and four wheel assemblies are shown in FIG. 3, a different number of sensor nodes or wheel assemblies could be included, among other undercarriage assemblies of railway car 310.

Railway car 310 comprises a vehicle used on a rail transport system, such as a freight car, truck, wagon, coach, or passenger car. Railway car 310 could be used to carry freight, cargo, passengers, or other items. Railway car 310 includes undercarriage portions, shown as wheel assemblies 312-315 in FIG. 3. Wheel assemblies 312-315 typically each comprise equipment related to the rolling motion of railway car 310, such as a wheel, axle, gearbox, bearing, bearing box, journal box, or other equipment.

Sensor nodes 320-327 each include equipment to sense and report information about undercarriage elements of a railway car. Each of sensor nodes 320-327 includes a sensor portion, and the sensor portion could include thermometers, thermocouples, thermistors, thermopiles, infrared (IR) emitters/detectors, microphones, ultrasonic emitters/detectors, accelerometers, strain gauges, flow gauges, chemical sensors, microelectromechanical system (MEMS) sensors, electrical sensors, among other sensing equipment and circuitry. Each of sensor nodes 320-327 also includes a transceiver portion for wireless communication with control node 330. In this example, the transceiver portion includes a wireless transceiver and antenna for wirelessly communicating with control node 330 using a Radio Frequency Identification (RFID) communication link. Each of sensor nodes 320-327 could also include a processing portion for receiving the sensor information, amplifying, scaling, modifying, adjusting, digitizing, or converting the sensor information, as well as controlling the transceiver portion and sensor portions. Each of sensor nodes 320-327 also comprises a power system, such as a battery or solar cell.

Sensor nodes 320-327 are each attached or coupled to the associated wheel assembly, preferably to a non-rotating portion, such as a bracket, bearing mount, or other non-rotating structure, although sensor nodes 320-327 could be coupled to a rotating portion of the associated wheel assembly, such as an axle, driveshaft, wheel, or other rotating member. In some examples, sensor nodes 320-327 are fastened to the associated wheel assembly with a mechanical fastener, such as a screw, rivet, wire, harness, weld, latch, or tie. In other examples, sensor nodes 320-327 are each coupled to the associated wheel assembly with an adhesive, such as glue, tape, Velcro, suction, or other adhesive or adhesive method. In yet further examples, sensor nodes 320-327 are each coupled to the associated wheel assembly with a magnet, such as an electromagnet, permanent magnet, rare-earth magnet, ceramic magnet, or other magnetic attachment device. Sensor nodes 320-327 could each be encased in a potted, weatherproof, or sealed enclosure, or may have openings for air circulation.

Control node 330 includes circuitry and equipment to exchange communications with each of sensor nodes 320-327. In many examples, control node 330 also includes circuitry and equipment to wirelessly exchange communications with a collection node, such as a maintenance system, maintenance personnel, or may provide a user interface for displaying a status of sensor nodes 320-327 to a user. Control node 330 may also include user interface systems, memory devices, computer-readable storage mediums, software, processing circuitry, or some other components. In some examples, control node 330 includes a positioning system, such as a global positioning system (GPS) receiver, to receive and interpret signals from positioning satellites to determine geographic coordinates of control node 330. Control node 330 could also comprise a power system, such as a battery or solar cell.

Control node 330 is attached or coupled to railway car 310. In some examples, control node 330 is fastened to railway car 310 with a mechanical fastener, such as a screw, rivet, wire, harness, weld, latch, or tie. In other examples, control node 330 is coupled to railway car 310 with an adhesive, such as glue, tape, Velcro, suction, or other adhesive or adhesive method. In yet further examples, control node 330 is coupled to railway car 310 with a magnet, such as an electromagnet, permanent magnet, rare-earth magnet, ceramic magnet, or other magnetic attachment device. Control node 330 could be coupled to railway car 310 internally or externally, on a side or end portion, among other locations. Control node 330 could be encased in a potted, weatherproof, or sealed enclosure, or may have openings for air circulation.

Collection node 340 comprises equipment for receiving fault conditions, sensor information, location information, or other information from control node 330 over wireless link 360. Collection node 340 also includes a computer system, microprocessor, circuitry, or some other processing device or software system, and may be distributed among multiple processing devices. Examples of collection node 340 may also include software such as an operating system, logs, utilities, drivers, networking software, and other software stored on a computer-readable medium. Collection node 340 could also include application servers, application service provider systems, database systems, logistics systems, web servers, or other systems.

Collection node 340 could collect fault conditions and other information from many control nodes. For example, on a train where many railway cars are connected in series, a control node could be coupled to each railway car along with associated sensor nodes. Collection node 340 could receive information from each control node of the train, and thus monitor the entire train. In some examples, control nodes include a GPS receiver, and could also provide positioning information to collection node 340. Collection node 340 could determine a position of a train based upon this information, as well as differentiate railway cars from each other within the train. Fault conditions could be isolated to a particular railway car, or to a specific location, which may detect track failure or be used to assess root cause of the failure. In further examples, the information received from multiple control nodes could be used to determine an order of railway cars in a train.

In yet further examples, collection node 340 is a rail-side or handheld device which receives information from control node 330 over a RFID wireless link as an operator passes by railway car 310 or as railway car 310 passes by an operator. Collection node 340 could include a user interface for displaying a status of control node 330 or sensor nodes 320-327 to a user. In some examples, a generalized condition (e.g., green, yellow, red) may be communicated over an RFID interface from control node 330 or from each of sensor nodes 320-327, but a handheld device could be used to download detailed logs from railway car 310. Sensor data logs and analytics may exceed the capacity of an RFID message payload, and the detailed logs or data could be stored within control node 330 or each of sensor nodes 320-327. The detailed logs or data could then be downloaded using handheld equipment when railway car 310 comes in to a repair area be serviced, perhaps due to an indication of the generalized condition.

Figure 4:
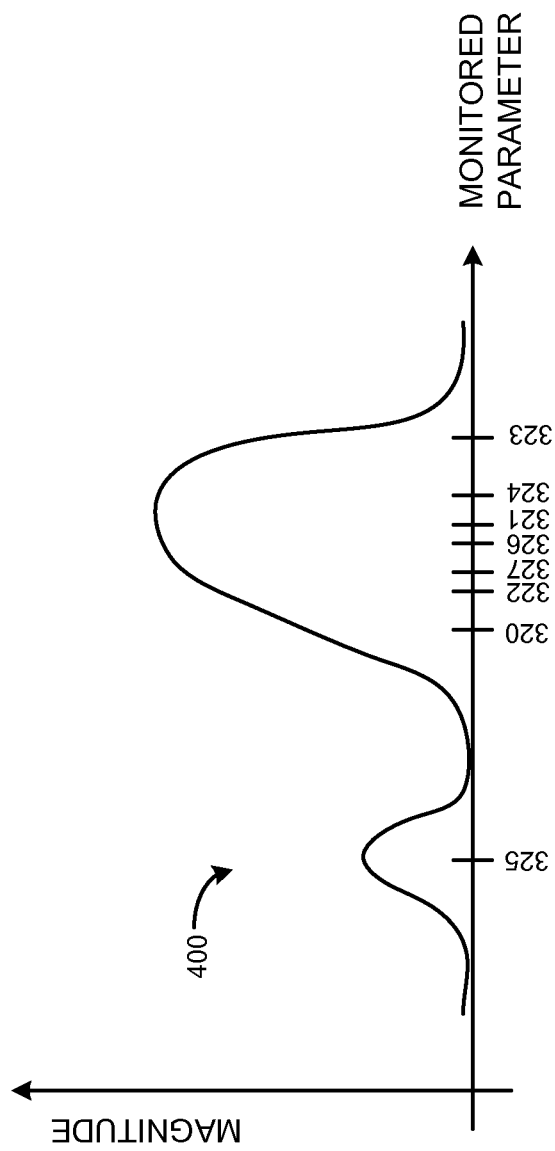
FIG. 4 is a graph illustrating example monitored values.

FIG. 4 is a graph illustrating example monitored values for railway car 310. Control node 330 or collection node 340 could analyze information or data from each of sensor nodes 320-327 in a manner similar to that described in FIG. 4, although alternate analysis could be performed as described herein. Graph 400 in FIG. 4 includes 2 axes, the vertical axis indicating a magnitude and the horizontal axis indicating a monitored parameter. For example, if the monitored parameter is vibration, then the horizontal axis of graph 400 could indicate a vibration frequency, and the vertical axis could indicate vibration amplitude. Each of sensor nodes 320-327 could report an associated vibration at an associated frequency and amplitude. As the reported values for each of sensor nodes 320-327 are plotted along the horizontal axis, their magnitudes indicate two peaks, one centered on the data for sensor node 325 and the other centered around data for the remaining sensor nodes.

In FIG. 4, the data plotted for each of sensor nodes 320-327 could be accumulated on graph 400 over time, creating a smooth curve instead of discrete points. As time passes, and the data on graph 400 continues to indicate a peak outside of the main cluster of data for each of sensor nodes 320-327, then control node 330 or collection node 340 could indicate a problem with sensor node 325 or the associated equipment monitored by sensor node 325. Thus, the population of all of sensor nodes 320-327 is taken into account to determine a dynamic threshold of failure. In some examples, a standard deviation metric is employed to determine when data from one or more sensor nodes becomes an outlier from a main cluster of sensor node data, such as when data from a sensor node deviates by more than three standard deviations, among other examples.

Failure alerts could be tailored to the number of sensor nodes 320-327 which become outliers, or based on the value of the monitored parameter if outside of expected norms. For example, when only one of sensor nodes 320-327 indicates outlier data as shown in FIG. 4, it could be determined that a wheel bearing or hotbox condition for a single wheel has occurred. A single wheel sensor anomaly might also indicate a 'wheel out of round' or 'flat spot' condition, where a non-round geometry of a wheel can cause vibrations or shocks at a certain portion of each rotation of a wheel. Taking sensor node 325 as an outlier in this example, then the right wheel of wheel assembly 314 could have a failure. In examples where two outliers occur for the same wheel assembly, then a failure of the entire wheel assembly could be determined, such as when an axle is damaged or brake applied mistakenly. Likewise, outliers for sensor nodes on an entire side of railway car 310 could indicate a cornering failure, or an off-track condition. Wheel assemblies can be referred to as 'trucks' in some examples, where two trucks are included on a railcar, each truck including four wheels on two axles. If four sensors, all on the same truck, deviate from the other four sensors on a railcar, a truck bearing failure condition could be determined. Other failure modes could be determined based on outlier data determined by any of sensor nodes 320-327.

Some examples describe a dynamic normalization, where the application of a sensor network on each railway car is employed to dynamically define norms of operation for each of the critical mechanical components. In the example shown in graph 400, the cluster of data from sensor nodes 320-324 and 326-327 could be considered the norm, while the data for sensor 325 could be considered a deviation or outlier. Other examples could be determined. Data is streamed from an array of sensors to a Data Correlation Unit (DCU) installed on each railway car. In some examples, the DCU comprises control node 130 or 330, or collection node 150 or 340. Analysis in both the temporal and sensor domains could be used to define a dynamic set of norms for the operating conditions of each mechanical component. Any significant deviation from these measurements is indicative of failure or projected failure. The population of sensors on each railway car, and the collection of measurements over a period of time, provides a baseline which is independent of railway car loading, weather, grade, track condition, component wear, and other environmental conditions. The degree to which any specific sensor deviates from this population is indicative of the severity of the mechanical condition of the component. When a deviation is detected, a wireless transmitter associated with the DCU could be activated and an alert generated. For example, when a sensor exhibits 'significant' deviation from the normal conditions, an event is generated by the DCU.

Each event could be ranked by severity and status could be provided periodically, such as twice daily, to provide railcar location and system status. The event ranking could include a 'yellow' condition which indicates that a railway car requires service, and a 'red' condition which indicates that a sensor has detected a serious deviation from normal operations that requires immediate service. In some examples, each railway car sensor array reports every 'n' seconds to the DCU, and the DCU aggregates and continuously analyzes the datastream from the sensors. The analysis is designed to be 'agnostic' to the specific sensor. Trend modeling identifies specific sensor telemetry that lies outside norms, where 'normal' can be defined dynamically by assessing the set of sensors on each railway car. Realtime, continuous monitoring of all critical railway car components can be monitored and predictive analytics performed for wheels, bearings and trucks which is dynamically adjusted to operating conditions. Rapid detection of handbrake sets can also be performed. A railway car health 'scorecard' could be provided to a user, presented via email, text message, web page, or discrete software interfaces.

In another embodiment, vibration is monitored as graph 400. The vibration could be monitored with a three-dimensional accelerometer, such as a solid state accelerometer device. The accelerations monitored by the 3-D accelerometer are interpreted as vibrations. In some examples, axial vibration is monitored along a single axis, such as a z-axis aligned with the axle of a particular wheel or wheel assembly, and vibrations in other axes are ignored, such as radial axes including an x-axis aligned with the horizontal and a y-axis aligned with the vertical with respect to the railway car or wheel. At high sampling rates of the accelerometer, the sampling only occurs for a portion of a wheel rotation, and radial acceleration or vibration (x-axis or y-axis) data could be ignored. Ignoring radial acceleration can allow for gravity and wheel balance effects to be minimized in the processing of vibration data for the wheel assemblies or wheels. Axial vibration data could still indicate wheel flat conditions, which are typically high impact, 'loud' events, vibrationally. By only sampling a portion of the wheel rotation a determination could be made on how much of the circumference of a wheel is damaged or flat based on the vibration characteristics. In an example wheel rotation, 60 milliseconds of vibration are sampled every two seconds and the vibrations are averaged (along with determining minimums and maximums) every sixty seconds and stored. Time series analysis could then performed on the readings to determine the failure conditions.

Although graph 400 is shown in FIG. 4 for clarity, it should be understood that a graph need not be employed in the processing of data received from sensor nodes 320-327, as the underlying data could be processed non-graphically. Also, although vibration is discussed above, it should be understood that any measured or monitored parameter could be employed for plotting data of each of sensor nodes 320-327 on graph 400. The monitored parameter could be any of the parameters of railway car 310 or any associated wheel assembly monitored by sensor nodes 320-327. As discussed herein, examples of sensor types may include thermometers, thermocouples, thermistors, thermopiles, infrared (IR) emitters/detectors, microphones, ultrasonic emitters/detectors, accelerometers, strain gauges, flow gauges, chemical sensors, microelectromechanical system (MEMS) sensors, electrical sensors, among other sensing equipment and circuitry.

Figure 5:
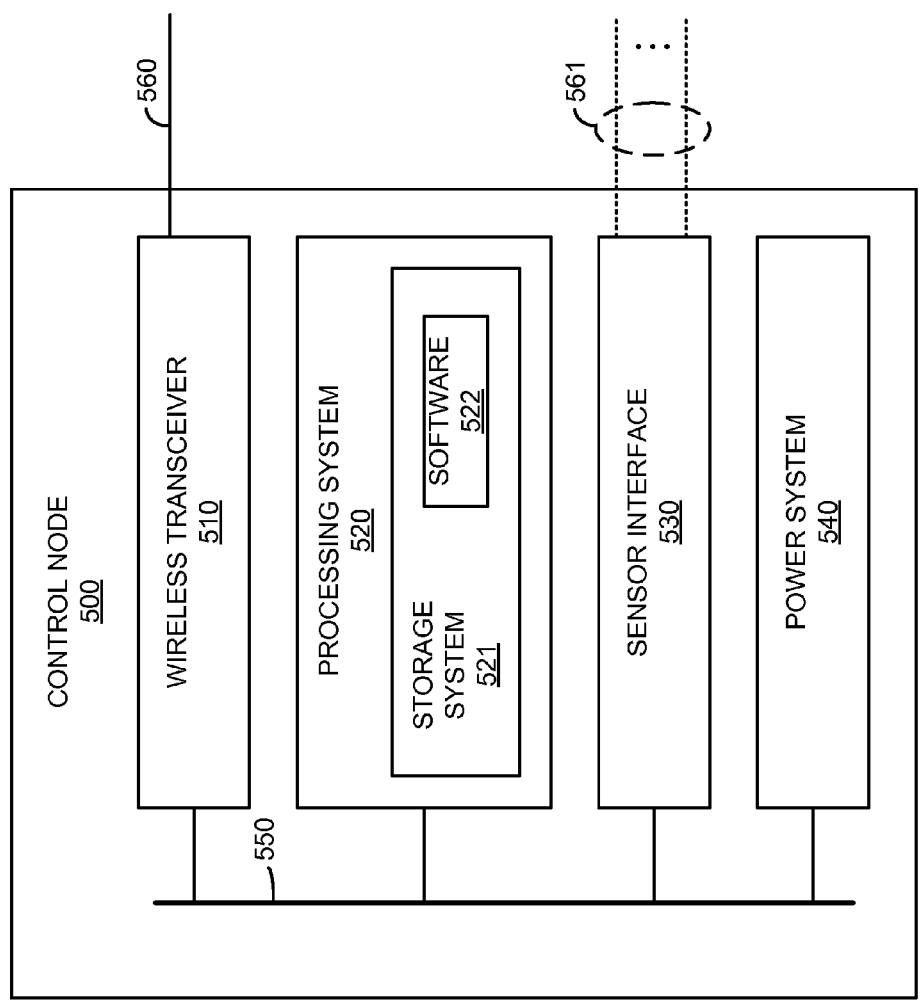
FIG. 5 is a block diagram illustrating a control node.

FIG. 5 is a block diagram illustrating control node 500, as an example of control node 130 found in FIG. 1 or control node 330 found in FIG. 3, although control node 130 or control node 330 could use other configurations. Control node 500 includes wireless transceiver 510, processing system 520, sensor interface 530, and power system 540. Wireless transceiver 510, processing system 520, sensor interface 530, and power system 540 communicate over bus 550. Control node 500 may be distributed among multiple devices that together form elements 510, 520-522, 530, 540, 550, and 560-561.

Wireless transceiver 510 comprises a communication interface for communicating with a wireless access node, such as a terrestrial base station or satellite station. Wireless transceiver 510 could include transceiver equipment and antenna elements for wirelessly exchanging fault conditions, sensor information, or other information, with a collection node, omitted for clarity, over wireless link 560. Wireless transceiver 510 also receives command and control information and instructions from processing system 520. Wireless transceiver 510 could use various protocols or communication formats as described herein for wireless links 161-165 or 270, including combinations, variations, or improvements thereof.

Processing system 520 includes storage system 521. Processing system 520 retrieves and executes software 522 from storage system 521. In some examples, processing system 520 is located within the same equipment in which wireless transceiver 510, sensor interface 530, or power system 540 are located. In further examples, processing system 520 comprises specialized circuitry, and software 522 or storage system 521 could be included in the specialized circuitry to operate processing system 520 as described herein. Storage system 521 could include a non-transient computer-readable medium such as a disk, tape, integrated circuit, server, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs processing system 520 to operate as described herein, such as receive information from sensor nodes, process the information to determine fault conditions, and report the fault conditions to a collection node.

Sensor interface 530 comprises communication interfaces for communicating with sensor nodes. Sensor interface 530 could include transceiver equipment or antenna elements for exchanging sensor information, omitted for clarity, over the associated links 561. In some examples, two or more of the associated links 561 are used to communicate with a single sensor node. Sensor interface 530 also receives command and control information and instructions from processing system 520 or wireless transceiver 510.

Power system 540 includes circuitry and a power source to provide power to the elements of control node 500. The power source could include a battery, solar cell, spring, flywheel, capacitor, thermoelectric generator, nuclear power source, chemical power source, dynamo, or other power source. In some examples, power system 540 receives power from an external source, such as a railway car. Power system 540 also includes circuitry to condition, monitor, and distribute electrical power to the elements of control node 500.

Bus 550 comprises a physical, logical, or virtual communication and power link, capable of communicating data, control signals, power, and other communications. In some examples, bus 550 is encapsulated within the elements of wireless transceiver 510, processing system 520, sensor interface 530, or power system 540, and may include a software or logical link. In other examples, bus 550 uses various communication media, such as air, space, metal, optical fiber, or some other signal propagation path, including combinations thereof. Bus 550 could be a direct link or might include various equipment, intermediate components, systems, and networks.

Figure 6:
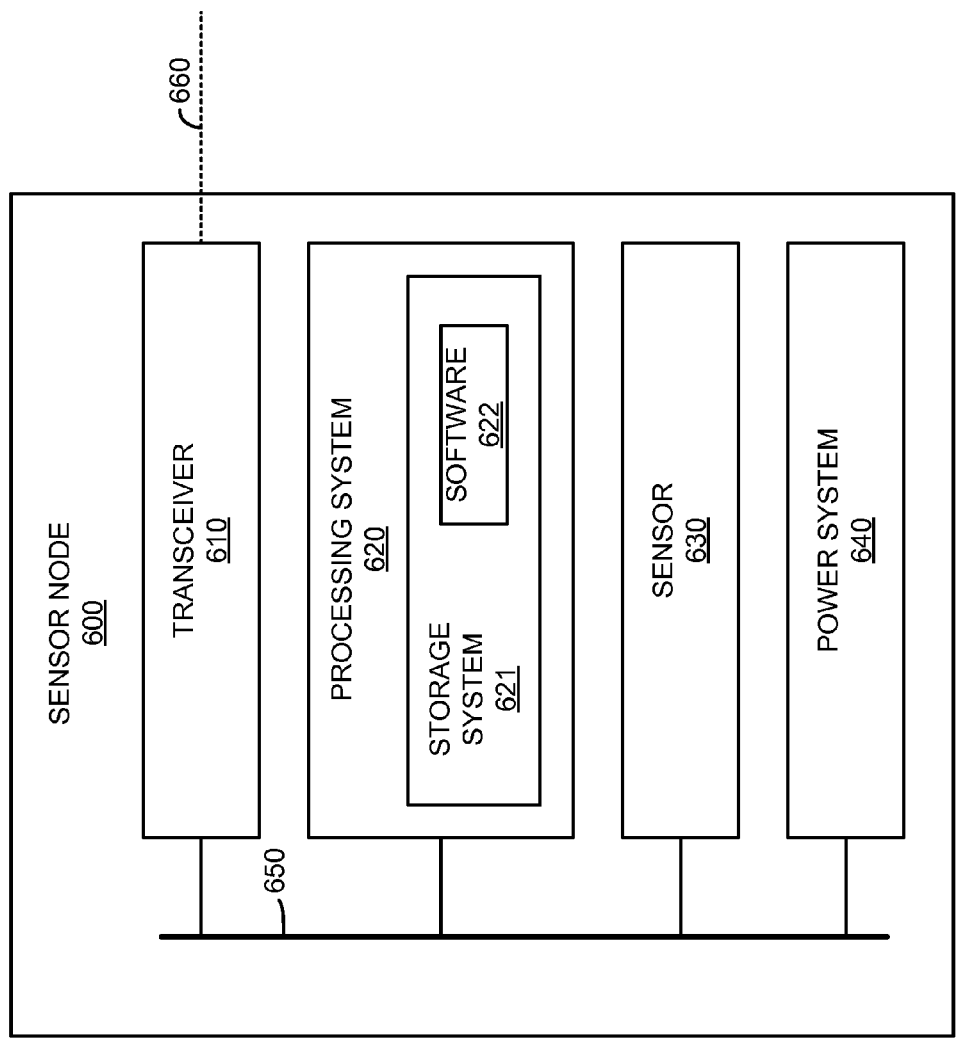
FIG. 6 is a block diagram illustrating a sensor node.

FIG. 6 is a block diagram illustrating sensor node 600, as an example of sensor nodes 121-124 found in FIG. 1 or sensor nodes 320-327 found in FIG. 3, although sensor nodes 121-124 or sensor nodes 320-327 could use other configurations. Sensor node 600 includes transceiver 610, processing system 620, sensor 630, and power system 640. Transceiver 610, processing system 620, sensor 630, and power system 640 communicate over bus 650. Sensor node 600 may be distributed among multiple devices that together form elements 610, 620-622, 630, 640, 650, and 660.

Transceiver 610 comprises a communication interface for communicating with a control node, such as control node 130 or control node 330. Transceiver 610 could include transceiver equipment and antenna elements for exchanging sensor information, data, or other information, with a control node, omitted for clarity, over link 660. Transceiver 610 also receives command and control information and instructions from processing system 620. Transceiver 610 could use various protocols or communication formats as described herein for links 161-164, including combinations, variations, or improvements thereof.

Processing system 620 includes storage system 621. Processing system 620 retrieves and executes software 622 from storage system 621. In some examples, processing system 620 is located within the same equipment in which transceiver 610, sensor 630, or power system 640 are located. In further examples, processing system 620 comprises specialized circuitry, and software 622 or storage system 621 could be included in the specialized circuitry to operate processing system 620 as described herein. Storage system 621 could include a non-transient computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs processing system 620 to operate as described herein, such as monitor sensor 630, process the sensor information, and transfer sensor information or data.

Sensor 630 comprises a sensor or sensors for monitoring an undercarriage element of a railway car. Sensor 630 could include sensor circuitry, amplifiers, analog-to-digital converters, microcontrollers, among other circuitry. The sensor circuitry could include, for example, thermometers, thermocouples, thermopiles, infrared (IR) emitters/detectors, microphones, ultrasonic emitters/detectors, accelerometers, strain gauges, flow gauges, chemical sensors, micro-electromechanical system (MEMS) sensors, electrical sensors, among other sensing equipment and circuitry.

Power system 640 includes circuitry and a power source to provide power to the elements of sensor node 600. The power source could include a battery, solar cell, spring, flywheel, capacitor, thermoelectric generator, nuclear power source, chemical power source, dynamo, or other power source. In some examples, power system 640 receives power from an external source, such as a railway car or control node. Power system 640 also includes circuitry to condition, monitor, and distribute electrical power to the elements of sensor node 600.

Bus 650 comprises a physical, logical, or virtual communication and power link, capable of communicating data, control signals, power, and other communications. In some examples, bus 650 is encapsulated within the elements of transceiver 610, processing system 620, sensor 630, or power system 640, and may include a software or logical link. In other examples, bus 650 uses various communication media, such as air, space, metal, optical fiber, or some other signal propagation path, including combinations thereof. Bus 650 could be a direct link or might include various equipment, intermediate components, systems, and networks.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A mobile railway car monitoring system, comprising:
a plurality of sensor nodes coupled to an undercarriage portion of a railway car;
a control node coupled to the railway car;
wherein each of the plurality of sensor nodes is configured to monitor the undercarriage portion of the railway car when in motion and transmit information about the undercarriage portion to the control node; and
wherein the control node is configured to receive the information about the undercarriage portion, process the information by at least monitoring for patterns of deviation in the information from a population of sensors comprising each of the plurality of sensor nodes to determine a fault condition for the undercarriage portion, and wirelessly report the fault condition to a collection system.

2. The mobile railway car monitoring system of claim 1, wherein each of the plurality of sensor nodes is configured to wirelessly transmit the information about the undercarriage portion to the control node.

3. The mobile railway car monitoring system of claim 1, wherein each of the plurality of sensor nodes is magnetically coupled to the undercarriage portion of the railway car.

4. The mobile railway car monitoring system of claim 1, wherein the control node is configured to process the information received from each of the plurality of sensor nodes over a period of time to determine a dynamic threshold for reporting the fault condition.

5. The mobile railway car monitoring system of claim 1, wherein the control node is configured to wirelessly report the fault condition over a wireless network.

6. The mobile railway car monitoring system of claim 1, wherein each of the plurality of sensor nodes is configured to transfer the information about the undercarriage portion over a radio frequency identification (RFID) interface.

7. The mobile railway car monitoring system of claim 1, wherein the control node is configured to wirelessly receive the information from each of the plurality of sensor nodes over a radio frequency identification (RFID) interface.

8. The mobile railway car monitoring system of claim 1, wherein each of the plurality of sensor nodes is configured to monitor vibration of the undercarriage portion of the railway car to determine vibration information, and wherein the information comprises the vibration information.

9. The mobile railway car monitoring system of claim 1, wherein the undercarriage portion comprises a population of wheels, and wherein the fault condition for the undercarriage portion comprises a deviation in the information for at least one wheel of the population of wheels from the information for the population of wheels.

10. A method of operating a mobile railway car monitoring system, the method comprising:
in each of a plurality of sensor nodes coupled to an undercarriage portion of a railway car, monitoring the undercarriage portion of the railway car when in motion and transmitting information about the undercarriage portion to a control node coupled to the railway car; and
in the control node, receiving the information about the undercarriage portion, processing via processing circuitry the information by at least monitoring for patterns of deviation in the information from a population of sensors comprising each of the plurality of sensor nodes to determine a fault condition for the undercarriage portion, and wirelessly reporting the fault condition to a collection system.

11. The method of claim 10, wherein transmitting the information about the undercarriage portion to the control node comprises, in each of the plurality of sensor nodes, wirelessly transmitting the information about the undercarriage portion to the control node.

12. The method of claim 10, wherein each of the plurality of sensor nodes is magnetically coupled to the undercarriage portion of the railway car.

13. The method of claim 10, comprising:
in the control node, processing the information received from each of the plurality of sensor nodes over a period of time to determine a dynamic threshold for reporting the fault condition.

14. The method of claim 10, wherein wirelessly reporting the fault condition to the collection system comprises wirelessly reporting the fault condition over a wireless network.

15. The method of claim 10, wherein transmitting the information about the undercarriage portion to the control node comprises, in each of the plurality of sensor nodes, transferring the information about the undercarriage portion over a radio frequency identification (RFID) interface.

16. The method of claim 10, wherein receiving the information about the undercarriage portion comprises, in the control node, wirelessly receiving the information from each of the plurality of sensor nodes over a radio frequency identification (RFID) interface.

17. The method of claim 10, comprising:
in each of the plurality of sensor nodes, monitoring vibration of the undercarriage portion of the railway car to determine vibration information, wherein the information comprises the vibration information.

18. The method of claim 10, wherein the undercarriage portion comprises a population of wheels, and wherein the fault condition for the undercarriage portion comprises a deviation in the information for at least one wheel of the population of wheels from the information for the population of wheels.

* * * * *